(12) United States Patent
Girolamo et al.

(10) Patent No.: US 11,549,482 B2
(45) Date of Patent: Jan. 10, 2023

(54) WIND TURBINE BLADE AND WIND TURBINE

(71) Applicant: Siemens Gamesa Renewable Energy A/S, Brande (DK)

(72) Inventors: Donato Girolamo, Voorhout (NL); Jens Jørgen Østergaard Kristensen, Nørresundby (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 64 days.

(21) Appl. No.: 16/825,164

(22) Filed: Mar. 20, 2020

(65) Prior Publication Data

US 2020/0300216 A1 Sep. 24, 2020

(30) Foreign Application Priority Data

Mar. 21, 2019 (EP) .................................... 19164335

(51) Int. Cl.
*F03D 1/06* (2006.01)
*B29D 99/00* (2010.01)
(Continued)

(52) U.S. Cl.
CPC ....... *F03D 1/0675* (2013.01); *B29D 99/0028* (2013.01); *B29K 2309/08* (2013.01);
(Continued)

(58) Field of Classification Search
CPC ...... F03D 1/0675; F03D 1/065; F03D 1/0641; F03D 80/30; B29D 99/0028;
(Continued)

(56) References Cited

U.S. PATENT DOCUMENTS 3,101,290 A * 8/1963 Paul .................. B29C 66/72141
156/137
4,976,587 A * 12/1990 Johnston ............... B64C 27/473
416/230
(Continued)

FOREIGN PATENT DOCUMENTS

DE 202013007886 U1 12/2014
EP 2781734 A1 9/2014
(Continued)

OTHER PUBLICATIONS

Extended European Search Report in related European Patent Application No. 19164335.2, dated Sep. 3, 2019. 7 pages.

*Primary Examiner* — David E Sosnowski
*Assistant Examiner* — Wayne A Lambert
(74) *Attorney, Agent, or Firm* — Schmeiser, Olsen & Watts LLP

(57) ABSTRACT

A wind turbine blade of a wind turbine, the wind turbine blade including a shell and a spar having at least one spar cap is provided. At least one of the at least one spar cap includes at least two longitudinal support structure elements, whereby at least two of the at least two longitudinal support structure elements are arranged adjacent to one another in a longitudinal direction of the wind turbine blade and at least one longitudinal support structure includes carbon fiber-reinforced plastic and at least one other longitudinal support structure includes at least one fiber-reinforced plastic different from carbon fiber-reinforced plastic.

9 Claims, 7 Drawing Sheets

(51) Int. Cl.
    *F03D 80/30*         (2016.01)
    *B29K 309/08*      (2006.01)
    *B29L 31/08*        (2006.01)

(52) U.S. Cl.
    CPC ......... *B29L 2031/085* (2013.01); *F03D 80/30* (2016.05); *F05B 2240/302* (2013.01); *F05B 2280/6003* (2013.01); *F05B 2280/6013* (2013.01); *F05B 2280/6015* (2013.01)

(58) Field of Classification Search
    CPC ........... B29K 2309/08; B29L 2031/085; F05B 2240/302; F05B 2240/30; F05B 2240/40; F05B 2230/60; F05B 2280/6003; F05B 2280/6013; F05B 2280/6015; F05B 2280/60; F05B 2250/02; F05B 2250/00; Y02P 70/50; Y02E 10/72
    See application file for complete search history.

(56) References Cited

U.S. PATENT DOCUMENTS

| | | | | |
|---|---|---|---|---|
| 7,364,407 B2 * | 4/2008 | Grabau | ................... | F03D 1/065 |
| | | | | 416/229 R |
| 7,427,189 B2 * | 9/2008 | Eyb | ........................ | F03D 1/065 |
| | | | | 416/226 |
| 7,521,105 B2 * | 4/2009 | Bech | ........................ | B29B 11/16 |
| | | | | 428/60 |
| 7,802,968 B2 * | 9/2010 | Jacobsen | ................. | F03D 1/065 |
| | | | | 416/241 A |
| 7,988,423 B2 * | 8/2011 | Hancock | ............... | F03D 1/0675 |
| | | | | 416/229 R |
| 8,231,351 B2 * | 7/2012 | Nies | ........................ | F03D 1/065 |
| | | | | 416/146 R |
| 8,348,622 B2 * | 1/2013 | Bech | ................... | B29C 66/1162 |
| | | | | 416/229 R |
| 9,140,235 B2 * | 9/2015 | Vossler | ................ | F03D 1/0641 |
| 9,394,881 B2 * | 7/2016 | Obrecht | ................ | B29C 70/304 |
| 9,581,134 B2 * | 2/2017 | Fukami | ................ | F03D 1/0675 |
| 9,920,630 B2 * | 3/2018 | Dahl | ........................ | F01D 5/147 |
| 2005/0180853 A1 | 8/2005 | Grabau et al. | | |
| 2010/0104447 A1 | 4/2010 | Eyb | | |
| 2010/0143142 A1 * | 6/2010 | Akhtar | ................... | F03D 1/0683 |
| | | | | 416/226 |
| 2010/0143148 A1 * | 6/2010 | Chen | .................... | F03D 1/0675 |
| | | | | 416/223 R |
| 2014/0234116 A1 * | 8/2014 | Cussac | ................. | F03D 1/0675 |
| | | | | 416/226 |
| 2015/0010406 A1 * | 1/2015 | Torgard | ................. | F01D 5/147 |
| | | | | 416/230 |
| 2015/0226180 A1 * | 8/2015 | Grove-Nielsen | ...... | F03D 1/0675 |
| | | | | 416/217 |
| 2017/0122287 A1 * | 5/2017 | Dobbe | .................. | B29C 66/721 |
| 2017/0342959 A1 | 11/2017 | Hayden et al. | | |
| 2018/0051672 A1 * | 2/2018 | Merzhaeuser | ........ | F03D 1/0675 |
| 2020/0072189 A1 * | 3/2020 | Merzhaeuser | ......... | F03D 80/30 |

FOREIGN PATENT DOCUMENTS

| | | | | |
|---|---|---|---|---|
| EP | 2922690 A1 | | 9/2015 | |
| EP | 3098063 A1 * | 11/2016 | ......... | B29C 43/3642 |
| EP | 3501808 A1 | | 6/2019 | |
| WO | WO-2012004571 A2 * | 1/2012 | ............ | B29C 70/84 |

* cited by examiner

WIND TURBINE BLADE AND WIND TURBINE

CROSS-REFERENCE TO RELATED APPLICATIONS

This application claims priority to European Patent Application No. EP 19164335.2, having a filing date of Mar. 21, 2019, the entire contents of which are hereby incorporated by reference.

FIELD OF THE TECHNOLOGY

The following is directed to a wind turbine blade of a wind turbine, the wind turbine blade comprising a shell and a spar having at least one spar cap. Moreover, the following is directed to a wind turbine comprising at least two wind turbine blades.

BACKGROUND

Wind turbine blades must be able to efficiently convert wind into spinning movement of the wind turbine blades, so that energy of the wind can be converted into rotary mechanical movement of a rotor to which the wind turbine blades are attached. It is preferable, to use materials having a high specific modulus (elastic modulus per mass density of a material), also known as stiffness to weight ratio, in wind turbine blades. This is particularly important in the spar caps of wind turbine blades, because the spar caps are subjected to high bending loads (also referred to as flapwise loads) occurring in the operation of the wind turbine.

EP 2922690 A1 relates to a wind turbine blade having a shell made from glass fiber-reinforced plastic and spar caps made from carbon fiber-reinforced plastics. Carbon fiber-reinforced plastics have a considerably higher stiffness and specific modulus than glass fiber-reinforced plastics. Thus, carbon fiber-reinforced plastics are preferable over glass fiber-reinforced plastics for usage in spar caps because they provide more resistance against bending loads at equal weight. However, it is challenging to introduce carbon fiber-reinforced plastics in spar caps of wind turbine blades without wrinkles. Wrinkling is one of the most common flaws that occurs during textile composite reinforcement forming processes. Thus, the proposed wind turbine blade is susceptible to failure.

U.S. 2010/0104447 A1 relates to a wind turbine blade comprising a pressure side spar cap and a suction side spar cap, wherein the suction side spar cap is fabricated from a material comprising a fiber reinforced matrix comprising at least one layer of glass fibers and at least one layer of carbon fibers embedded in a common matrix material. By using a hybrid carbon-glass material in spar caps it is possible to reduce structural risk of failure due to wrinkling while increasing the specific modulus. Thereby, a stiffness and weight between that of pure carbon and that of pure glass can be achieved. However, the carbon fibers are not used to their fullest potential in a hybrid material mix.

Thus, there is still a need for a wind turbine blade and a wind turbine with a high specific modulus and low risk of structural failure.

Features and details discussed with respect to the wind turbine blade are also related to features and details discussed with respect to the wind turbine and vice versa.

SUMMARY

According to a first aspect of the present invention, the problem is solved by a wind turbine blade of a wind turbine, the wind turbine blade comprising a shell and a spar having at least one spar cap, whereby at least one of the at least one spar cap comprises at least two longitudinal support structure elements, whereby at least two of the at least two longitudinal support structure elements are arranged adjacent to one another in a longitudinal direction of the wind turbine blade and at least one longitudinal support structure elements comprises carbon fiber-reinforced plastic and at least one other longitudinal support structure comprises at least one fiber-reinforced plastic different from carbon fiber-reinforced plastic.

Thereby, it is possible to design the spar cap of the wind turbine blade with fiber-reinforced plastic different from carbon fiber-reinforced plastic, such as glass fiber-reinforced plastic, at portions of the wind turbine blade, that are particularly susceptible to failure and where the allowance for wrinkles is very low. The other portions of the spar cap of the wind turbine blade, that are less susceptible to failure and where the allowance for wrinkles is relatively higher, can be designed with carbon fiber-reinforced plastic and thereby use of the carbon's high specific modulus is made in order to provide a wind turbine blade of overall high stiffness and light weight.

In particular, the longitudinal support structure elements of the spar cap are the structural elements of the spar cap, that provide the spar cap with the capability of withstanding the flapwise loads without damage to the wind turbine blade. More particularly, the spar cap is made from the longitudinal support structure elements.

The spar has two or four or more spar caps and every spar cap comprises at least two longitudinal support structure elements. In particular, two of the at least one spar caps are facing each other. The two spar caps facing each other may be connected by at least one spar web, that is being subjected to shear loads occurring during operation of the wind turbine. The spar web may be connected to mid portions of the spar caps, thereby providing an I-beam spar. The two spar caps facing each other may further be connected by two spar webs connected to side portions of the spar caps, thereby providing a box spar for increased torsional support.

In particular, the longitudinal support structure elements have their longest extension in the longitudinal direction of the wind turbine blade. The longitudinal support structure elements arranged adjacent to one another in a longitudinal direction of the wind turbine blade in particular means that the longitudinal support structure elements are touching each other. Adjacent longitudinal support structure elements are connected to one another and their longitudinal support structure elements or parts thereof are overlapping one another.

The fiber-reinforced plastic different from carbon fiber-reinforced plastic may be a glass fiber-reinforced plastic, a basalt fiber-reinforced plastic, a Kevlar® fiber-reinforced plastic or a hybrid combination of these, for example. The longitudinal support structure comprising fiber-reinforced plastic different from carbon fiber-reinforced plastic may comprise carbon fiber-reinforced plastic, for example as part of a hybrid fiber-reinforced plastic. However, the longitudinal support structure comprising fiber-reinforced plastic different from carbon fiber-reinforced plastic may comprise only fiber-reinforced plastic different from carbon fiber-reinforced plastic or a maximum of up to 50%, up to 30% and up to 20% of carbon fiber-reinforced plastic.

In an exemplary embodiment of the present invention, at least one of the at least one longitudinal support structure comprising carbon fiber-reinforced plastic is predominantly comprising carbon fiber-reinforced plastic as fiber-reinforced plastic and at least one of the at least one other longitudinal support structure comprising at least one fiber-reinforced plastic different from carbon fiber-reinforced plastic is predominantly comprising fiber-reinforced plastics different from carbon fiber-reinforced plastic as fiber-reinforced plastic.

In a further embodiment of the present invention, at least two adjacent longitudinal support structure elements are connected to one another by means of a structural joint. The structural joint provides a secure connection between adjacent longitudinal support structure elements.

It is particularly preferable that a longitudinal support structure is merged into an adjacent longitudinal support structure to form the structural joint. In particular, fiber-reinforced plastic from one of the longitudinal support structure elements is arranged in a space formed in the adjacent longitudinal support structure and vice versa, so that the adjacent longitudinal support structure elements are merged with each other. Thereby, the structural joint is formed by the longitudinal support structure elements themselves and a very secure connection can be obtained even though different materials are being used.

Further, it is particularly preferable that the structural joint is resin molded. This provides an even securer connection between adjacent longitudinal support structure elements because the longitudinal support structure elements are resin molded together at the structural joint.

In another exemplary embodiment of the present invention, at least two adjacent longitudinal support structure elements are arranged at an arrangement angle of $0.5°≤α≤10°$, in particular $1°≤α≤7°$, with respect to each other. The arrangement angle is an angle between central longitudinal axes of adjacent longitudinal support structure elements. The angle is defined in the 3D space, its "edgewise component" is dominant. Thereby it is easily possible to form a tip sweep, even when using relatively stiff carbon fiber-reinforced plastic material.

In yet another exemplary embodiment of the present invention, the glass fiber-reinforced plastic comprises at least one unidirectional glass mat and/or the carbon fiber-reinforced plastic comprises at least one unidirectional pultruded carbon fiber element. In particular, the glass fiber-reinforced plastic are unidirectional glass mats and/or the carbon fiber-reinforced plastic are pultruded carbon fiber elements. The unidirectional glass fibers of the unidirectional glass mat and/or the unidirectional carbon fibers of the pultruded carbon fiber element are arranged in the longitudinal direction of the wind turbine blade.

In a further exemplary embodiment of the present invention, a length of at least two adjacent longitudinal support structure elements is different from one another. A length of a support structure comprising carbon fiber-reinforced plastic is greater than a length of a support structure comprising the at least one different fiber-reinforced plastic. Thereby, the overall mass of the spar cap is reduced for a constant tip deflection.

In yet a further exemplary embodiment of the present invention, the support structure comprising carbon fiber-reinforced plastic terminates at least 5 m, at least 7 m and at least 10 m, from a tip of the wind turbine blade. Carbon fiber-reinforced plastic is electrically conductive. By providing the carbon fiber-reinforced plastic a distance from lightning receptors at the tip of the wind turbine blade, direct lightning strikes of the carbon fiber-reinforced plastic can be avoided to avoid damage of the spar cap.

In yet another exemplary embodiment of the present invention, the at least one end portion of at least one of the at least two longitudinal support structure elements is tapered, in particular in its longitudinal direction and/or with a tapering angle of $0.2°≤β≤5°$, with a tapering angle of $0.3°≤β≤2°$. The support structure may also be tapered in a direction transverse to the longitudinal direction, i.e. the width direction of the support structure. By means of tapering the support structure it becomes possible to further control the stiffness of the spar cap.

According to a second aspect of the present invention, there is a wind turbine comprising at least two wind turbine blades according to the first aspect of the present invention. Therefore, the wind turbine according to the second aspect of the present invention can offer the same advantages as those described for the wind turbine blade according to the first aspect of the present invention. An exemplery embodiment is a wind turbine comprising three such wind turbine blades.

BRIEF DESCRIPTION

Some of the embodiments will be described in detail, with reference to the following figures, wherein like designations denote like members, wherein.

Same aspects in FIGS. 1 to 9 are denominated with the same reference number. If there is more than one aspect of the same kind in one of the figures, the asoects are numbered in ascending order with the ascending number of the aspects being separated from its reference number by a dot.

DETAILED DESCRIPTION

Figure 1:
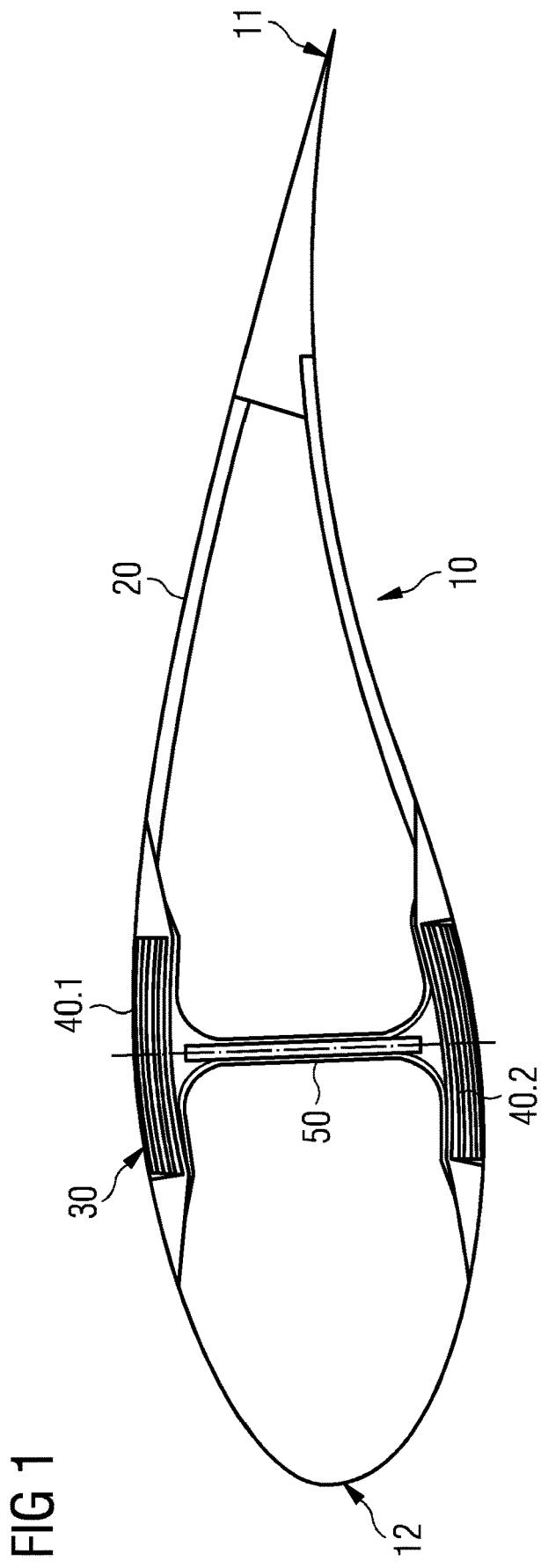
FIG. 1 depicts a sectional view along a transversal plane of a first embodiment of a wind turbine blade.
Figure 2:
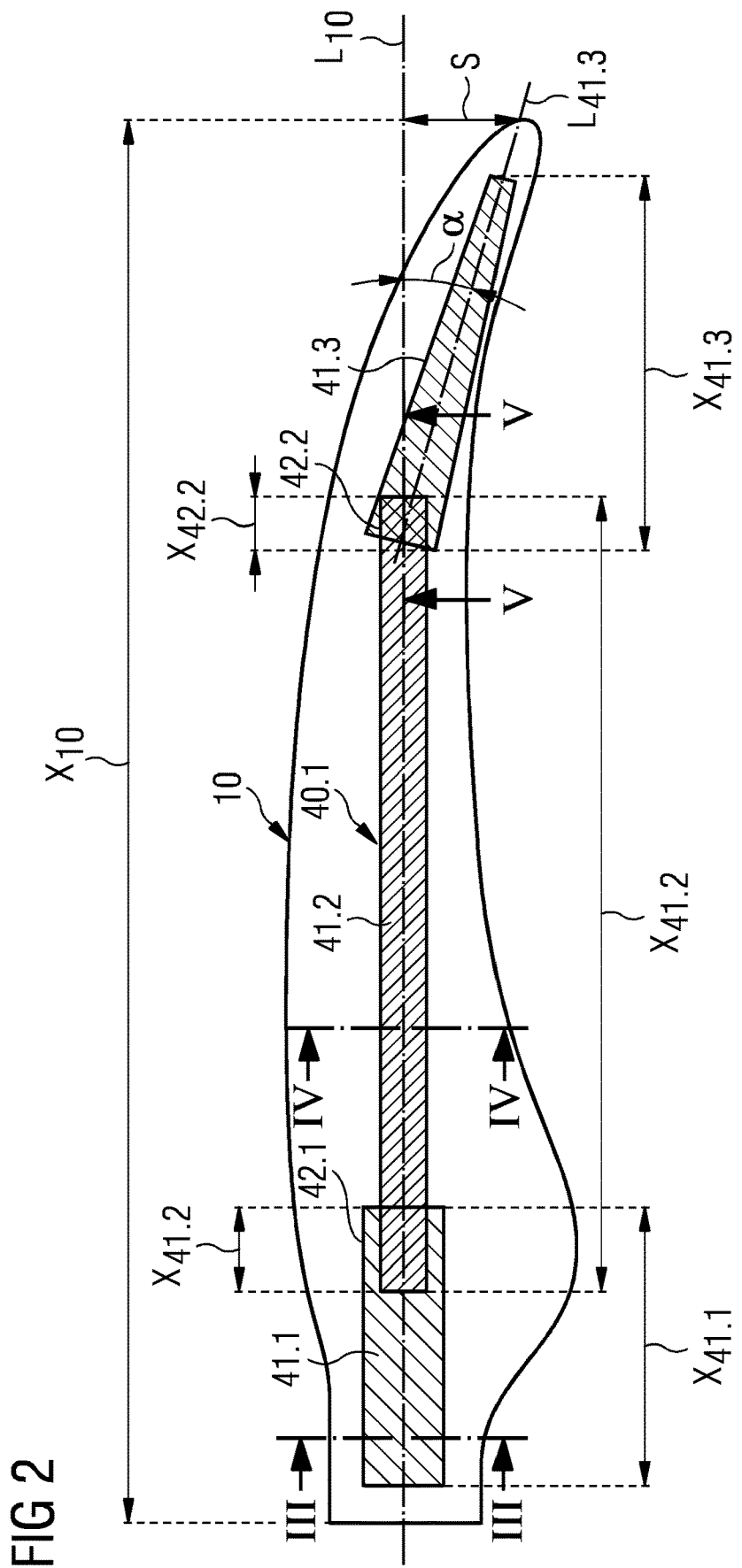
FIG. 2 depicts a projected view along a shell plane of the first embodiment of the wind turbine blade with spar caps elements highlighted.

FIG. 1 is a sectional view along a transversal plane of a first embodiment of a wind turbine blade 10 according to the embodiment of the present invention. The transversal plane is transverse, in particular perpendicular, to a longitudinal axis $L_{10}$ of the wind turbine blade 10, which is indicated in FIG. 2. The wind turbine blade 10 has a trailing edge 11 and a leading edge 12. The wind turbine blade 10 comprises a shell 20 and a spar 30. The spar 30 comprises two spar caps 40.1, 40.2, which face each other and are connected to one another by means of a spar web 50.

FIG. 2 is a sectional view along a shell plane of the first embodiment of the wind turbine blade 10 of FIG. 1. The shell plane is a plane running through the upper part of the curved shell 20 and the spar cap 40.1, which is transverse, in particular perpendicular, to the transversal plane. The spar cap 40.1 of the wind turbine blade 10 comprises three longitudinal support structure elements 41.1, 41.2, 41.3. The first and third longitudinal support structure elements 41.1, 41.3 are made from glass fiber-reinforced plastic and the second longitudinal support structure 41.2 is made from carbon fiber-reinforced plastic.

The first longitudinal support structure 41.1 is arranged at a root or at a distance of about 2 m from the root of the wind turbine blade 10 and its length $X_{41.1}$ is 20% of the length $X_{10}$ of the wind turbine blade 10 in this particular embodiment. The length $X_{10}$ of the wind turbine blade 10 is measured along the longitudinal axis $L_{10}$ from the root to the tip of the wind turbine blade 10. The first longitudinal support structure 41.1 may have a length $X_{41.1}$ of 10% to 30% of the length $X_{10}$ of the wind turbine blade 10, for example. The first support structure 41.1 enables a smooth stiffness increase of the spar cap 40.1 in a direction from the root to the tip of the wind turbine blade 10. Moreover, glass fiber-reinforced plastic is more cost-effective than carbon fiber-reinforced plastic and close to the root of the wind turbine blade a stiffness as high as the one of carbon fiber-reinforced plastic is typically not necessary.

The second longitudinal support structure 41.2 is arranged in a middle portion of the wind turbine blade 10 and is arranged in between the first support structure 41.1 and the third support structure 41.3. The length $X_{41.2}$ of the second support structure is 50% of the length $X_{10}$ of the wind turbine blade 10 in this particular embodiment. The second longitudinal support structure 41.1 may have a length $X_{41.2}$ of 30% to 80% of the length $X_{10}$ of the wind turbine blade 10, for example. The first longitudinal support structure 41.1 enables an overall increase of the stiffness of the spar cap 40.1 of the wind turbine blade 10 by containing its mass.

The third longitudinal support structure 41.3 is arranged at the root or at a distance of 5 m from the root of the wind turbine blade 10 and is arranged adjacent to the second longitudinal support structure 41.2. The length $X_{41.3}$ of the third longitudinal support structure 41.3 is 30% of the length $X_{10}$ of the wind turbine blade 10 in this particular embodiment. The third longitudinal support structure 41.1 may have a length $X_{41.3}$ of 10% to 40% of the length $X_{10}$ of the wind turbine blade 10, for example. The third longitudinal support structure 41.3 prevents the second longitudinal support structure 41.2 made from carbon fiber-reinforced plastic from being damaged when the tip of the wind turbine blade 10 is being struck by a lightning.

The first longitudinal support structure 41.1 and the second support structure 41.2 are connected to each other by means of a first structural joint 42.1 having a length $X_{42.1}$ in which the first longitudinal support structure 41.1 and the second longitudinal support structure 41.2 overlap each other. Further, the second longitudinal support structure 41.2 and the third longitudinal support structure 41.3 are connected to each other by means of a second structural joint 42.2 having a length $X_{42.2}$ in which the second longitudinal support structure 41.2 and the third longitudinal support structure 41.3 overlap each other. The longitudinal support structure elements 41.1, 41.2, 42.3 are securely connected to one another by means of the structural joints 42.1, 42.2, which are resin molded in this particular embodiment.

The second longitudinal support structure 41.2 is arranged with respect to the third support structure 41.3 at an arrangement angle of α=5° formed between the longitudinal axis of the second longitudinal support structure 41.2, which is coinciding with the longitudinal axis $L_{10}$ of the wind turbine blade 10 in this particular embodiment, and the longitudinal axis $L_{41.3}$ of the third longitudinal support structure 41.3. Thereby, a tip sweep S, a distance of the tip from the longitudinal axis $L_{10}$ of the wind turbine blade 10, is formed.

Figure 3:
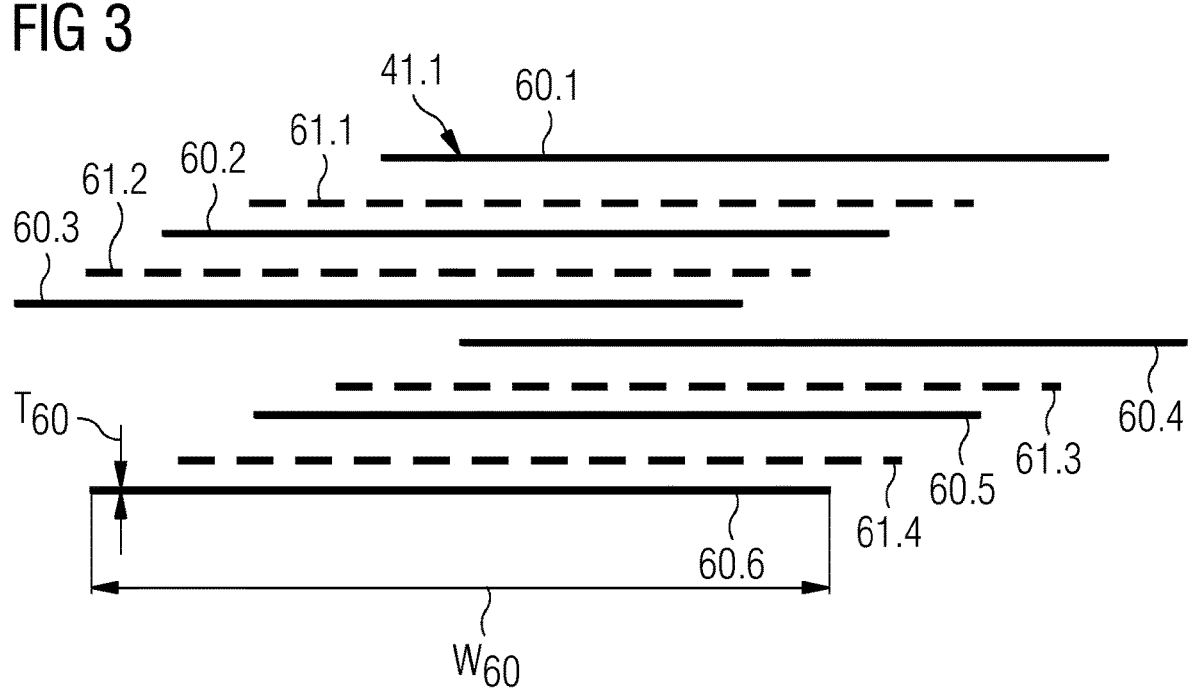
FIG. 3 depicts an exploded sectional view along a transversal plane of a support structure along line of FIG. 2.

FIG. 3 is an exploded sectional view along a transversal plane of the first longitudinal support structure 41.1 along line of FIG. 2. The transversal plane is transverse, in particular perpendicular, to a longitudinal axis of the first longitudinal support structure 41.1, which is coinciding with the longitudinal axis $L_{10}$ of the wind turbine blade 10 in this particular embodiment. Two different types of glass mats 60, 61 are being used for the first longitudinal support structure 41.1 in this embodiment, which are arranged as alternating layers of the first type of glass mat 60.1, 60.2, 60.3, 60.4, 60.5, 60.5 and second type of glass mat 61.1, 61.2, 61.3, 61.4 having a width $W_{60}$ and a thickness $T_{60}$. The width $W_{60}$ may be in the range of 400 mm to 1200 mm. The thickness $T_{60}$ may be in the range of 0.1 mm to 2.0 mm. The first type of glass mat 60.1, 60.2, 60.3, 60.4, 60.5, 60.5 may be a biax non-crimp fabric. The second type of glass mat 61.1, 61.2, 61.3, 61.4 may be unidirectional glass mat.

Figure 4:
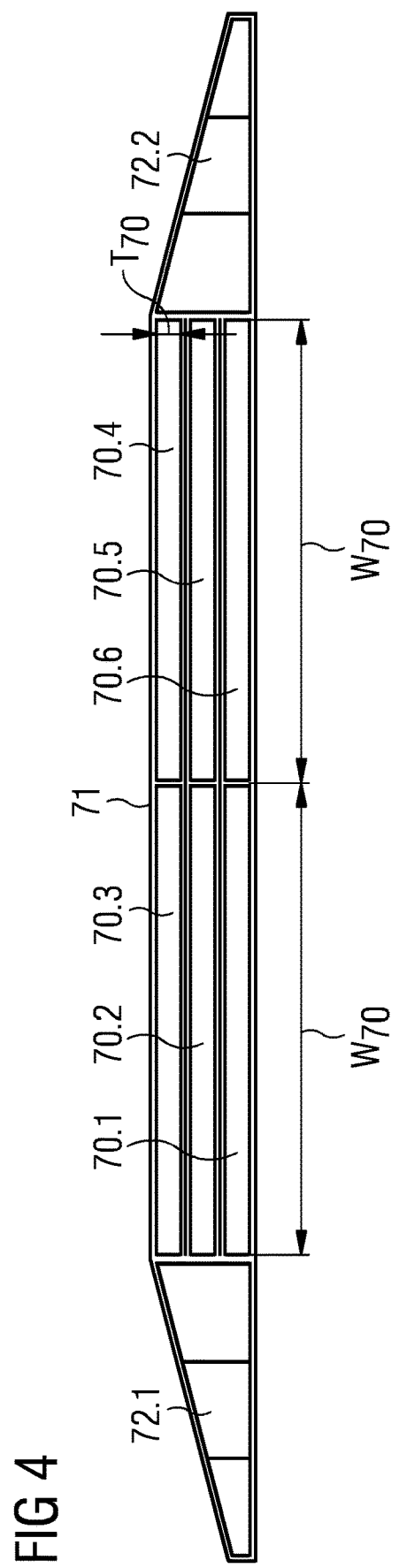
FIG. 4 depicts an exploded sectional view along the transversal plane of a support structure along line IV-IV of FIG. 2.

FIG. 4 is an exploded sectional view along a transversal plane of the second longitudinal support structure 41.2 along line IV-IV of FIG. 2. The transversal plane is transverse, in particular perpendicular, to a longitudinal axis of the second longitudinal support structure 41.2, which is coinciding with the longitudinal axis $L_{10}$ of the wind turbine blade 10 in this particular embodiment. Pultruded carbon fiber elements 70.1, 70.2, 70.3, 70.4, 70.5, 70.6 are provided in the second longitudinal support structure 41.2. In particular, a first stack with stacked carbon fiber elements 70.1, 70.2, 70.3 and a second stack with stacked carbon fiber elements 70.4, 70.5, 70.6 are provided adjacent to each other in the longitudinal direction of the second longitudinal support structure 41.2. The carbon fiber elements have a width of $W_{70}$, which may be in the range of 50 mm to 300 mm. The thickness of the carbon fiber elements can be i.e. in the range of 2-5 mm. A first wedge element 72.1 is arranged next to the first stack comprising the carbon fiber elements 70.1, 70.2, 70.3 forming an outer long side of the second longitudinal support structure 41.2. A second wedge element 72.2 is arranged next to the second stack comprising the carbon fiber elements 70.4, 70.5, 70.6 forming another outer long side of the second longitudinal support structure 41.2. The wedge elements 72.1, 72.2 may comprise or be made from basalt, balsa, a foam or glass, for example. A cover mat 71 is surrounding the carbon fiber elements 70.1, 70.2, 70.3, 70.4, 70.5, 70.6 and the wedge elements 72.1, 72.2. The cover mat 71 may comprise multiple cover mats or parts thereof. The cover mats may comprise or be made from carbon, glass, basalt or a hybrid combination thereof, for example.

Figure 5:
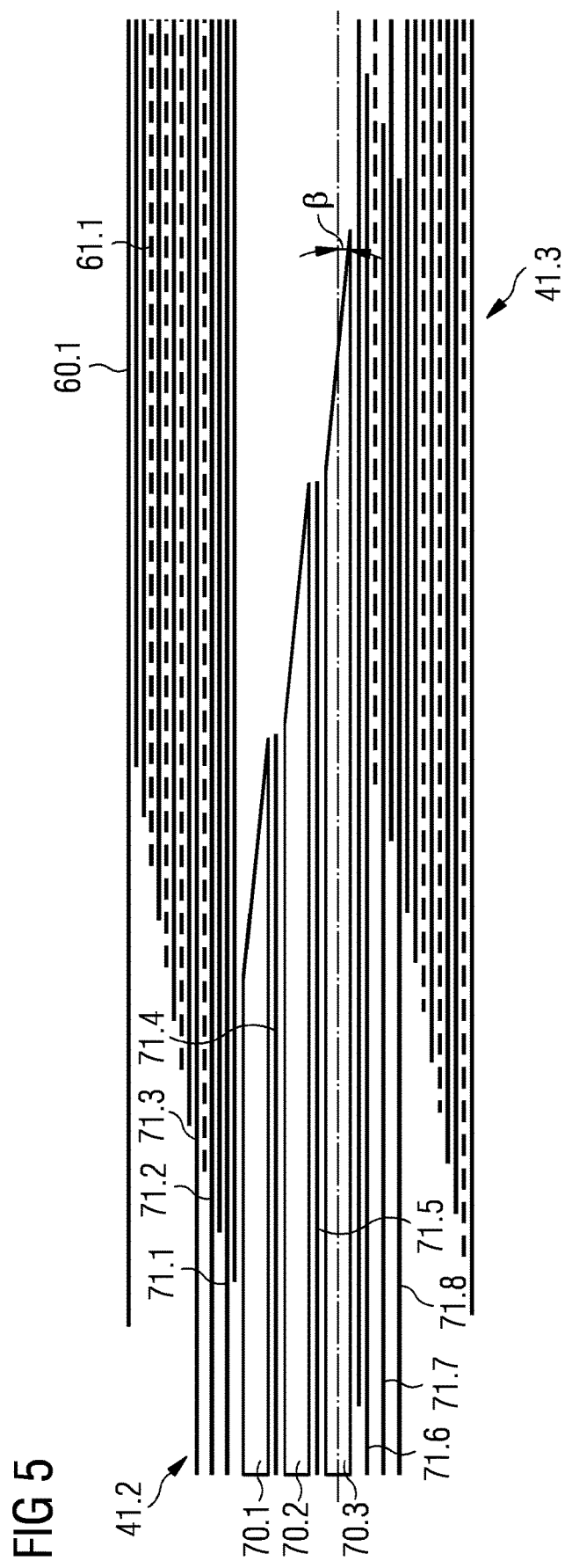
FIG. 5 depicts an exploded sectional view along a longitudinal plane of a structural joint along line V-V of FIG. 2.

FIG. 5 is an exploded sectional view along a longitudinal plane of the structural joint 42.2 along line V-V of FIG. 2. The carbon fiber elements 70.1, 70.2, 70.3 of the second longitudinal support structure 41.2 are surrounded by cover mats 71.1, 71.2, 71.3, 71.4, 71.5, 71.6, 71.7, 71.8 and the carbon fiber elements 70.1, 70.2, 70.3 and cover mats 71.1, 71.2, 71.3, 71.4, 71.5, 71.6, 71.7, 71.8 are merged into the third support structure 41.3 having multiple layers of glass mat 60, 61, only the glass mats 60.1 and 61.1 of which are denominated. Also, the glass mats 60.1 and 61.1 of the third longitudinal support structure 41.3 are arranged in spaces between the carbon fiber elements 70.1, 70.3 and cover mats 71.1, 71.2, 71.3, 71.6, 71.7, 71.8 so that the third longitudinal support structure 41.3 is merged into the second longitudinal support structure 41.2. The structural joint 42.2 is resin molded, the resin covering the entire structural joint 42.2 and not being shown. The second longitudinal support structure 41.2, in particular each of the carbon fiber elements 70.1, 70.2, 70.3, is tapered in its longitudinal direction with a tapering angle of β=0.3° in this particular embodiment.

Figure 6:
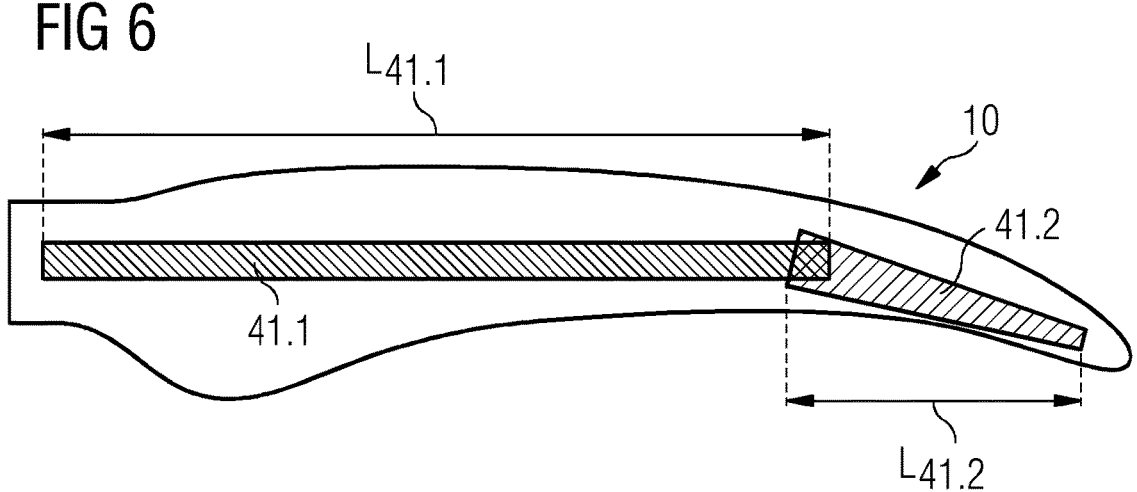
FIG. 6 depicts a projected view along the shell plane of a second embodiment of the wind turbine blade with spar caps elements.

FIG. 6 is a sectional view along a shell plane of a second embodiment of the wind turbine blade 10 according to the embodiment of the present invention. The spar cap 40.1 of the wind turbine blade 10 comprises two longitudinal support structure elements 41.1, 41.2. The first longitudinal support structure 41.1 is made from carbon fiber-reinforced plastic and the second longitudinal support structure 41.2 is made from glass fiber-reinforced plastic. The first longitudinal support structure 41.1 and the second longitudinal support structure 41.2 are arranged at an arrangement angle of α=5° with respect to each other and are connected to each other by means of a structural joint 42.1. The first longitudinal support structure 41.1 has a greater length than the length of the second longitudinal support structure 41.2.

Figure 7:
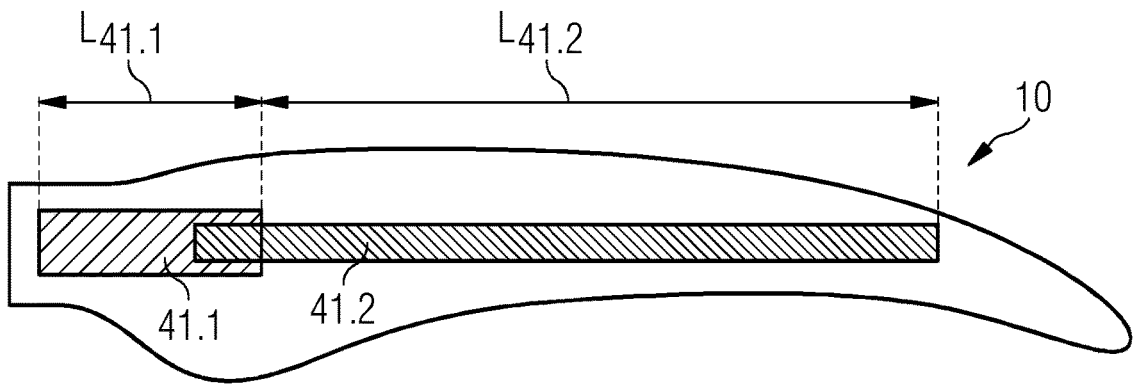
FIG. 7 depicts a projected view along the shell plane of a third embodiment of the wind turbine blade with spar caps elements.

FIG. 7 is a sectional view along a shell plane of a third embodiment of the wind turbine blade 10 according to the embodiment of the present invention. The spar cap 40.1 of the wind turbine blade 10 comprises two longitudinal support structure elements 41.1, 41.2. The first longitudinal support structure 41.1 is made from glass fiber-reinforced plastic and the second longitudinal support structure 41.2 is made from carbon fiber-reinforced plastic. The first longitudinal support structure 41.1 and the second longitudinal support structure 41.2 are connected to each other by means of a structural joint 42.1. The first longitudinal support structure 41.1 has a shorter length than the length of the longitudinal second support structure 41.2. Further, the first longitudinal support structure 41.1 is wider than the longitudinal second support structure 41.2. The second longitudinal support structure 41.2 made from carbon fiber-reinforced plastic is terminated 10 m from the tip of the wind turbine blade 10 to avoid damage due to a lightning strike.

Figure 8:
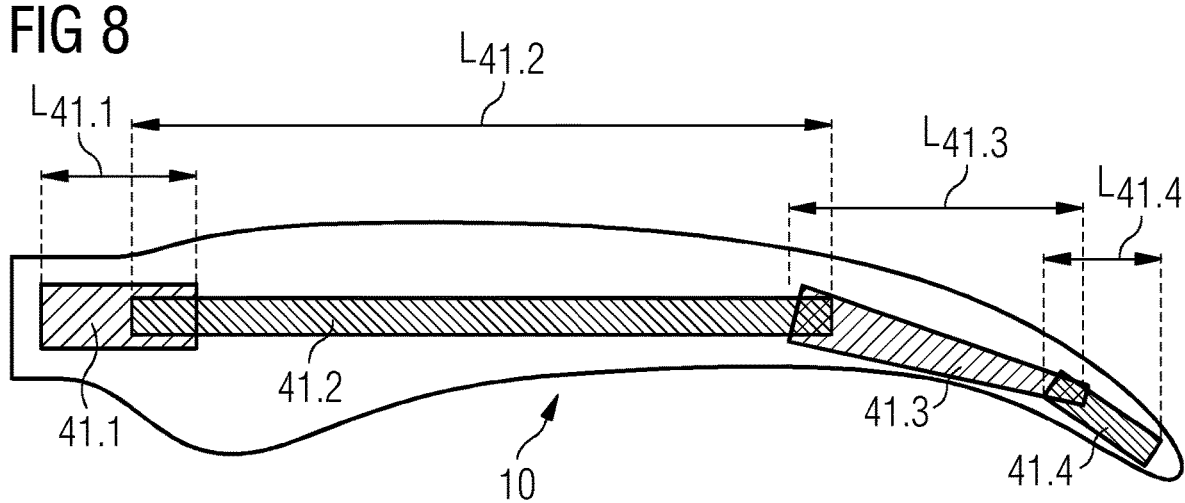
FIG. 8 depicts a projected view along the shell plane of a fourth embodiment of the wind turbine blade with spar caps elements.

FIG. 8 is a sectional view along a shell plane of a fourth embodiment of the wind turbine blade 10 according to the embodiment of the present invention. The spar cap 40.1 of the wind turbine blade 10 comprises four longitudinal support structure elements 41.1, 41.2, 41.3, 41.4. The first, third and fourth longitudinal support structure elements 41.1, 41.3, 41.4 are made from glass fiber-reinforced plastic and the second longitudinal support structure 41.2 is made from carbon fiber-reinforced plastic. Adjacent longitudinal support structure elements 41.1, 41.2, 41.3, 41.4 are connected to each other by means of structural joints 42.1, 42.2, 42.3. The second longitudinal support structure 41.2 has a greater length than each one of the other longitudinal support structure elements 41.1, 41.3, 41.4. The second longitudinal support structure 41.2 and the third longitudinal support structure 41.3 are arranged at an arrangement angle of α=5° with respect to each other. Further, the third longitudinal support structure 41.3 and the fourth longitudinal support structure 41.4 are arranged at an arrangement angle of α=5° with respect to each other. Thereby, the overall tip sweep S of the wind turbine blade 10 is increased without overloading any of the longitudinal support structure elements 41.1, 41.2, 41.3, 41.4.

Figure 9:
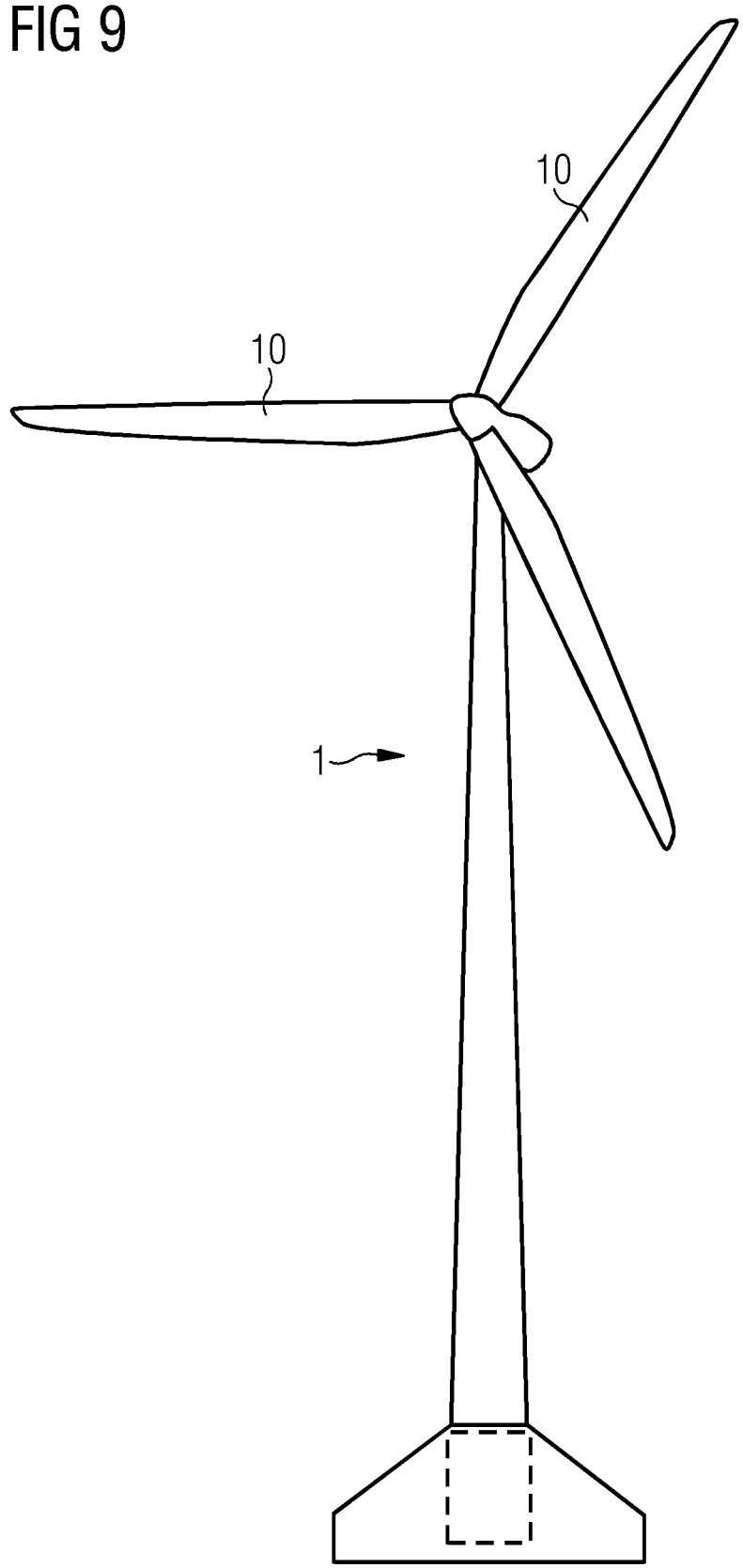
FIG. 9 depicts a wind turbine comprising wind turbine blades.

FIG. 9 shows schematically a wind turbine 1 comprising wind turbine blades 10 according to the embodiment of the present invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade of a wind turbine, the wind turbine blade comprising:
a shell; and
a spar having at least one spar cap,
wherein at least one of the at least one spar cap comprises at least two adjacent longitudinal support structure elements, whereby one of the at least two longitudinal support structure elements is arranged in a space formed in an adjacent support structure element to merge the at least two longitudinal support structure elements together such that the at least two longitudinal support structures themselves form a structural joint therebetween so that the at least two longitudinal support structures are connected to one another in a longitudinal direction of the wind turbine blade, and at least one longitudinal support structure comprises carbon fiber-reinforced plastic and at least one other longitudinal support structure comprises at least one fiber-reinforced plastic different from carbon fiber-reinforced plastic.

2. The wind turbine blade according to claim 1, wherein at least one of the at least one longitudinal support structure comprising carbon fiber-reinforced plastic is predominantly comprising carbon fiber-reinforced plastic as fiber-reinforced plastic and at least one of the at least one other longitudinal support structure comprising at least one fiber-reinforced plastic different from carbon fiber-reinforced plastic is predominantly comprising fiber-reinforced plastics different from carbon fiber-reinforced plastic as fiber-reinforced plastic.

3. The wind turbine blade according to claim 1, wherein the structural joint is resin molded.

4. The wind turbine blade according to claim 1, wherein the at least two adjacent longitudinal support structure elements are arranged at an arrangement angle of $0.5° \leq \alpha \leq 10°$ with respect to each other.

5. The wind turbine blade according to claim 1, wherein the at least one fiber-reinforced plastic comprises at least one unidirectional glass mat and/or the carbon fiber-reinforced plastic comprises at least one pultruded carbon fiber element.

6. The wind turbine blade according to claim 1, wherein a length of at least two of the at least two adjacent longitudinal support structure elements is different from one another.

7. The wind turbine blade according to claim 1, wherein the at least one longitudinal support structure comprising carbon fiber-reinforced plastic terminates at least 5 m from a tip of the wind turbine blade.

8. The wind turbine blade according to claim 1, wherein at least one end portion of at least one of the at least two adjacent longitudinal support structure elements is tapered in a longitudinal direction and/or with a tapering angle of $0.2° \leq \beta \leq 5°$.

9. The wind turbine comprising at least two wind turbine blades according to claim 1.

* * * * *